United States Patent [19]
Syeda-Mahmood

[11] Patent Number: 6,009,198
[45] Date of Patent: Dec. 28, 1999

[54] METHOD FOR MATCHING PERCEPTUAL SHAPE SIMILARITY LAYOUTS ACROSS MULTIPLE 2D OBJECTS

[75] Inventor: Tanveer F. Syeda-Mahmood, Rochester, N.Y.

[73] Assignee: Xerox Corporation, Stamford, Conn.

[21] Appl. No.: 08/975,466

[22] Filed: Nov. 21, 1997

[51] Int. Cl.$^6$ .............................. G06K 9/62; G06K 9/34
[52] U.S. Cl. ............................................ 382/215; 382/173
[58] Field of Search .................................... 382/173, 176, 382/180, 296, 298, 294, 215, 216

[56] References Cited

U.S. PATENT DOCUMENTS

| | | | |
|---|---|---|---|
| 3,905,045 | 9/1975 | Nickel | 444/1 |
| 3,993,976 | 11/1976 | Ginsburg | 340/146.3 |
| 4,503,556 | 3/1985 | Scherl et al. | 382/9 |
| 5,001,766 | 3/1991 | Baird | 382/46 |
| 5,185,813 | 2/1993 | Tsujimoto | 382/9 |
| 5,359,676 | 9/1994 | Fan | 382/56 |
| 5,438,628 | 8/1995 | Spitz et al. | 382/181 |
| 5,452,374 | 9/1995 | Cullen et al. | 382/293 |
| 5,574,802 | 11/1996 | Ozaki | 382/176 |
| 5,642,288 | 6/1997 | Leung et al. | 364/478.11 |
| 5,689,585 | 11/1997 | Bloomberg et al. | 382/229 |
| 5,822,454 | 10/1998 | Rangarajan | 382/180 |

OTHER PUBLICATIONS

"A Stochastic Attribute Grammar Model of Document Production and its use in Document Image Decoding", by G. Kopec and P. Chou, Document Recognition II, Proceedings SPIE 2422, Feb. 7, 1995.

"Localizing Overlapping Parts by Searching the Interpretation Tree", by W. Grimson and T. Lozano–Perez, IEEE Trans on PAMI, vol. Pami–9, No. 4, 1987.

"Adaptive Document Segmentation and Geometric Relation Labeling: Algorithms and Experimental Results", by J. Liu, Y.Y. Tang, Q. He, C.Y. Suen, Proceedings of ICPR 1996.

"Nested Segmentation: An Approach for Layout Analysis in Document Classification", by X. Hao, J. Wang, P. Ng, from Proceedings Second Intl. Conf. on Document Analysis and Recognition, Oct. 1993.

Watanabe in "Layout Recognition of Multi–Kinds of Table––Form Documents", IEEE Transactions Pattern Analysis and Machine Intelligence.

*Primary Examiner*—Amelia Au
*Assistant Examiner*—Martin E. Miller
*Attorney, Agent, or Firm*—L. M. Ortiz; G. B. Cohen; P. E. Blair

[57] ABSTRACT

A method for matching objects based on spatial layout of regions based on a shape similarity model for detecting similarity between general 2D objects. The method uses the shape similarity model to determine if two objects are similar by logical region generation in which logical regions are automatically derived from information in the objects to be matched, region correspondence, in which a correspondence is established between the regions on the objects, pose computation in which the individual transforms relating corresponding regions are recovered, and pose verification in which the extent of spatial similarity is measured by projecting one document onto the other using the computed pose parameters. The method of the invention can be carried out in a microprocessor-based system capable of being programmed to carry out the method of the invention.

19 Claims, 8 Drawing Sheets

METHOD FOR MATCHING PERCEPTUAL SHAPE SIMILARITY LAYOUTS ACROSS MULTIPLE 2D OBJECTS

FIELD OF THE INVENTION

This invention is related to object matching based on shape similarity and, more particularly, to a method and means by which spatial layout of regions can be captured for purposes of matching documents.

BACKGROUND OF THE INVENTION

In today's world, increasing numbers of documents are being scanned in large quantities or are being created electronically. To maintain and manage these documents requires new methods that analyze, store and retrieve the documents. Current document management systems can support document database creation from scanned documents and indexing based on text queries. A need for allowing more visual queries has been felt, particularly in retrieving documents when text keywords are unreliably extracted (from scanned documents due to OCR errors), or retrieve too many choices for a user to select from. In such cases the intention of the user is best captured by either allowing more flexible queries making reference to a document genre or type (say, find me a "letter" from "X" regarding "sales" and "support"), or by simply pointing to an icon or example, and asking "find me a document looking similar to it in visual layout." Performing either requires an ability to automatically derive such document genre or type information from similarity in the visual layouts of documents rather than their precise text content, which may be quite different. An example illustrating this can be seen from FIGS. 1A and 1B which are two similar-looking documents with very different text content.

Figure 1A:
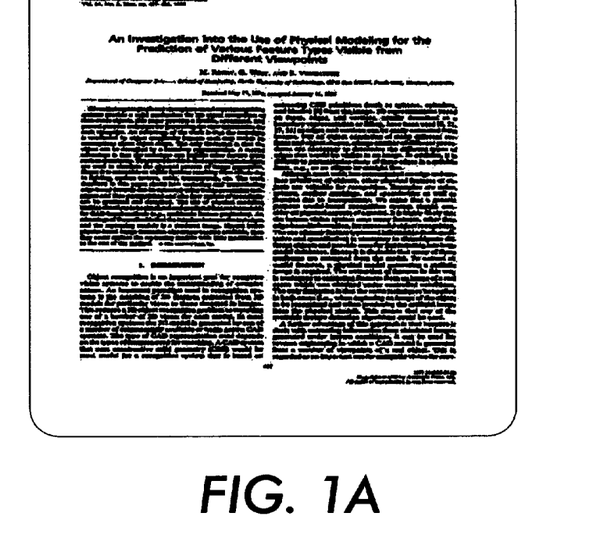
FIGS. 1A and 1B illustrates two similar-looking documents.
Figure 1B:
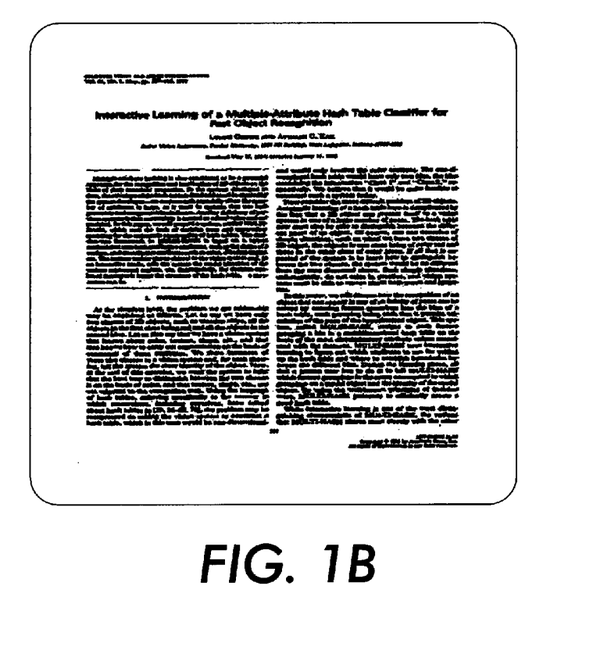

Matching based on spatial layout similarity is a difficult problem, and has not been well-addressed. The above examples also illustrate the outstanding difficulty. The two documents in FIG. 1A and 1B are regarded as similar even though their logically corresponding regions (text segments) shown in FIGS. 2A and 2B, respectively, differ in size. Furthermore, some of the corresponding regions have moved up while others have moved down and by different amounts.

While matching based on spatial layout similarity by using a generalized shape model has not been attempted before, previous work exists on several methods of document matching based on image content. Some of these extract a symbolic graph-like description of regions and perform computationally intensive subgraph matching to determine similarity, as seen in the work of Watanabe in "Layout Recognition of Multi-Kinds of Table-Form Documents", IEEE Transactions Pattern Analysis and Machine Intelligence. Furthermore, U.S. Pat. No. 5,642,288 to Leung et al. entitled "Intelligent document recognition and handling" describes a method of document image matching by performing some image processing and forming feature vectors from the pixel distributions within the document.

Disclosures of the patent and all references discussed above and in the Detailed Description of the invention are hereby incorporated herein by reference.

SUMMARY OF THE INVENTION

The invention is a method for matching objects, with specific examples of matching documents, based on spatial layout of regions that addresses the above difficulties. It employs a shape similarity model for detecting similarity between 2D objects The shape similarity model is general enough to encompass the individual region shape variations between members of a shape class, and yet specific enough to avoid mismatches to objects with perceptually different appearance. That is, the shape model models the change in shape of corresponding regions on objects by a set of separate affmine deformations, with constraints on the transforms that are intended to capture perceptual shape similarity between objects.

Using the shape model, two objects are taken to match if one of them can be found to belong to the shape class of the other document. Specifically, the "document" matching proceeds in 4 stages, namely, (1) pre-processing, in which logical regions are automatically derived from information in the documents to be matched, (2) region correspondence, in which a correspondence is established between the regions on the documents, and (3) pose computation, in which the individual transforms relating corresponding regions are recovered, and finally (4) verification, in which the extent of spatial similarity is measured by projecting one document onto the other using the computed pose parameters.

The document matching method specifically described herein can be suitably combined with other text-based retrieval methods to enhance the capability of current document management systems. Such a document matching method has several applications. It can be used to describe document genres (such as letters, memos) based on spatial layout. Other uses of the document matching method include the clustering of documents based on similarity for purposes of document database organization.

The "object" matching method has the following novel features:

1. The underlying shape model and the associated recognition method is general and is intended to capture perceptual shape similarity in a variety of 2D shapes (besides documents) that consist of regions, such as engineering drawings, MRI brain scans, video, outdoor natural scenes, house layout plans in real-estate databases, etc.
2. It is a fast method of obtaining region correspondence that avoids exponential search.
3. It has an ability to group similar shaped objects into shape categories or genres.
4. It provides a way of finding similar-looking objects under changes in object orientation, skew (rotation and shear (misfed pages)) that is fast and does not require pixel-based computations as in object image matching methods.
5. It provides an ability to retrieve documents based on spatial layout information (through query by example) which can be a suitable complement to text-based retrieval.
6. Finally, each of the operations in object matching are computationally simple.

DESCRIPTION OF THE DRAWINGS

The accompanying drawings, which are incorporated in and form part of the specification, illustrate an embodiment of the present invention and, together with the description, serve to better explain the operation features, and advantages of the invention. It should be understood, however, that the invention is not limited to the precise arrangements and instrumentalities shown.

DETAILED DESCRIPTION OF THE INVENTION

The invention disclosed here is a method of object matching based on a shape model to capture shape layout similarity across multiple 2D objects. In modeling shape similarity, objects are characterized by a collection of regions representing some logical entity of the object, such as say, a logical text region like a paragraph. The methods to obtain such regions are expected to be domain-specific and frequently involve some image pre-processing. Although the term "document" is used throughout this disclosure, it is not meant to limit the application of the invention to documents, but rather this method is intended to apply broadly to "object" matching.

The document matching method described herein generally proceeds in 4 stages after documents containing logical regions to be matched are identified. The steps are: Pre-processing 1, in which logical regions are automatically derived from information in the documents to be matched; Region correspondence 2, in which a correspondence is established between the regions on the documents; Pose computation 3, in which the individual transforms relating corresponding regions are recovered, and finally, Verification 4 is conducted, in which the extent of spatial similarity is measured by projecting one document onto the other using the computed pose parameters. These steps will be discussed in more detail in Section B of this disclosure, below.

The document matching method is based on the following shape similarity model that is intended to capture spatial layout similarity of logical regions in 2d objects and, in particular, logical regions of a document image.

A. The Shape Similarity Model

The shape similarity model describes the characteristics of the shape class of an object M consisting of a set of m regions $R_{mi, i=1 \text{ to } m}$. According to the shape model, the object M is said to be similar to another object I characterized by the set of regions $R_{Ij, j=1, \ldots n}$ if enough pairs of corresponding regions can be found such that the shape deformations of the corresponding regions can be specified by a set of affine transforms $(A_{ij}, T_{ij})$ that obey the following three constraints:

1. Direction of residual translation constraint:

The first constraint specifies that object regions displace along a common direction, called the reference direction. That is, the direction of residual translation of corresponding regions must be the same which is denoted by:

$$\gamma_{ijy} = \gamma_{ijx} \tan \theta, \forall i,j$$

where $(\gamma_{ijx}, \gamma_{ijy})^T = \gamma_{ij} = C_{Ij} - C_{Mi}$ is the residual translation and $C_{Ij}$ and $C_{Mi}$ are the centroids of the regions $R_{Ij}$ in object I and $R_{Mi}$ of object M. When $\theta = 90$ degrees, $\gamma_{ijx} = 0$.

The direction of residual translation can be either manually specified or can be automatically derived by computing the direction of residual motion for all pairs of regions, and recording the commonality in direction using a Hough transform.

2. Extent of translation constraint:

The second constraint restricts the amount of displacement each of the regions can undergo to maintain perceptual similarity. The extent of residual translation of all corresponding regions is bounded by $\delta$ so that $$\left| \sqrt{1 + \tan^2 \theta} \, \gamma_{ijx} \right| \leq \delta$$

or equivalently:

$$|\gamma_{ijx}| \leq |\delta \cos \theta|$$

$$|\gamma_{ijy}| \leq |\delta \sin \theta|$$

For $\theta = 90$, the bound on the extent of translation is given by $|\gamma_{ijx}| \leq \delta$.

Note that included in the constraint on the extent of residual translation, is the case when some regions don't move at all from their original positions while others do along a common direction. When $(A_{ij}, T_{ij})$ is the same for all regions j for an object i, this reduces to a rigid-body shape model.

3. Ordering of regions constraint:

The final constraint restricts the displacement of regions such that relative ordering is maintained. That is, the ordering of corresponding regions on objects with respect to the reference direction $\theta$ be the same. The ordering of regions is obtained by projecting the centroids of regions onto the reference direction using a direction of projection (orthogonal or oblique). Such a region ordering for an object can be conveniently represented by a sequence $R = (R_{j1}, R_{j2}, \ldots R_{jm})$. Regions of the same rank appear in this sequence ordered along the direction of projection.

The above constraints have been carefully chosen through studies that observe that such constraints perceptual shape similarity for a wide variety of objects, including faces, MRI scans, etc.

B. The method of document matching

The method of document matching disclosed in this invention involves the following stages:

1. Logical region extraction from document segments.
2. Region correspondence between the two documents to be matched using the constraints of the shape model.
3. Pose computation between corresponding regions.
4. Pose verification by projecting one of the documents onto the other using the computed pose.

1. Logical region extraction

To use the shape similarity model for document matching, a set of logical regions need to be derived. While the document matching methods admits several methods of obtaining logical regions, we chose to obtain them by a grouping algorithm that uses text segments given by a conventional text segmentation algorithm (we used a version of software in Xerox's TextBridge™ for extracting text segments). The grouping algorithm performs the following operations:

1. Text segment regions whose bounding boxes are left aligned, right aligned, or centrally aligned are noted.
2. Among the regions in Step-1, those that are vertically spaced by a small distance are retained. The distance thresholds is chosen relative to the page image size. One way to derive the threshold is to record the inter-region separation over a large training set of documents of a certain genre and record the pixel-wise separation in the image versions of documents.
3. Text regions retained in Step-2 are used to form groups of regions. The grouping is done as follows:
   a. Initially put all text segments into their own groups.
   b. For each text segment, determine the text segments that fall within the logical region distance constraint (given above). Merge all such regions into one group.
   c. Successively merge groups using step b, until the set of groups cannot be further reduced.

The above algorithm can be efficiently implemented using a data structure called the union-find data structure as described in a book by Cormen, Leisersen and Rivest entitled "Introduction to algorithms", MIT Press, 1994, to run in time linear in the number of text regions in the document.

The above algorithm has been found particularly useful for grouping consecutive paragraphs of text into single logical regions, as well as for grouping centrally aligned information such as author information in a journal article.

2. Region correspondence

The method of obtaining region correspondence is again meant for general objects, and can be easily adapted to logical regions of documents. The correspondence between logical regions is obtained by using the constraints in the shape similarity model. Thus starting with all pairs of regions on the two objects, all those pairs whose direction of residual translation is not in the specified direction $\theta$ are pruned (this is checked within a threshold to allow some robustness against segmentation errors and deviations from the shape similarity model in individual documents). Next, the extent of residual translation constraint is used to further prune the pairs. The distinct regions in the pairs on each object can now be ordered with respect to the reference direction $\theta$. The region orderings can be denoted by the sequences $R_M$ and $R_I$ respectively. Using the region ordering, and collecting the set of candidate matching regions in object M for each region of object I by $S_i$ the result can be denoted by the set sequence $S_p=(S_1,S_2,\ldots S_p)$ where p is the number of regions in object I that found a match to a region in object M. The best region correspondence is taken as the longest subsequence of $R_M$ that is also a member sequence of $S_p$. A member sequence of $S_p$ is a sequence of regions with at most one region taken from the set S. It can be easily shown that the problem of finding the longest common sub-sequence (LCS) has optimal substructure property, thus admitting solutions by dynamic programming. In fact, we adapted the dynamic programming algorithm for computing an LCS described in Introduction to algorithms by T. Cormen, Leiserson, and R. Rivest, to give region correspondence by LCS using the following simple procedure:

Let m=length of sequence $R_M$ and n=length of set sequence $S_p$.

The LCS of $R_M$ and $S_p$ is determined by first computing the length of LCS and backtracking from the indices contributing to the longest sequence to derive an LCS.

The intermediate results are recorded in a dynamic programming table c[0...m,0...n], where entry c[i,j] denotes the length of LCS based on the prefixes of $R_M$ and $S_p$ of length i and j respectively. The table is initialized by c[i,0]=0=c[0,j] for all i,j.

The code is given below:

```
for i = 1 to m do
  for j = 1 to n do
    if x_i ∈ S_j
      then c[i,j] = c[i-1,j-1]+1
    else
      if c[i-1,j] ≧ c[i,j-1]
        then c[i,j] = c[i-1,j]
        else c[i,j] = c[i,j-1]
```

By keeping a record of which of the three values c[i−1,j−1],c[i−1,j],c[i,j−1] actually contributed to the value of c[i,j] in the above procedure, we can reconstruct an LCS in linear time.

The above steps give the largest set of corresponding regions between query and prototype that move along the same direction within bounds of the shape model, have a match in individual content, and retain the spatial layout ordering specified. Although the number of possible LCS for general sequences can be exponential in the worst case, for typical spatial layouts of regions in documents, only a few distinct LCS have to be tried to discover shape similarity.

Figure 3A:
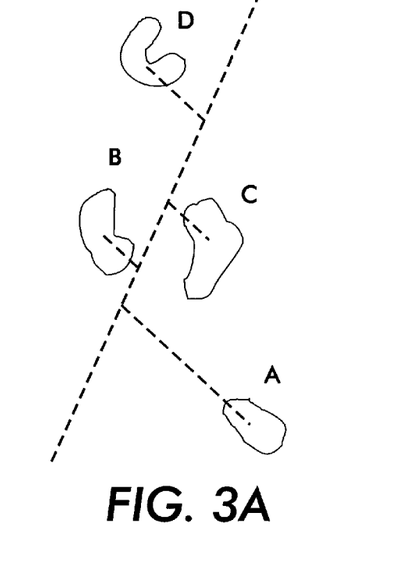
FIGS. 3A and 3B illustrates an example illustrating region correspondence for objects.
Figure 3B:
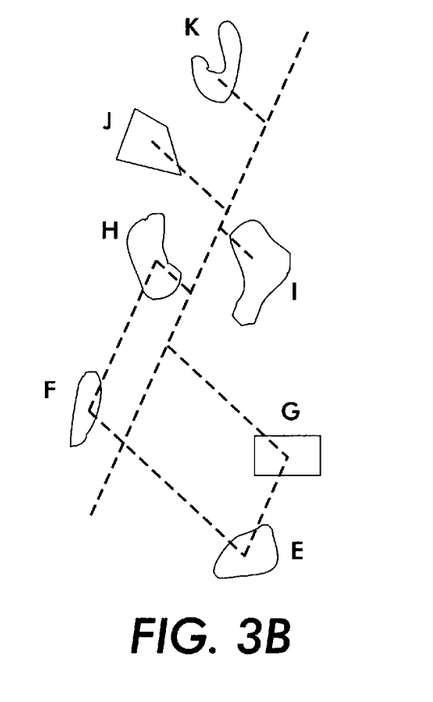

Region Correspondence Example:

FIGS. 3A and 3B is used to illustrate the region correspondence for a simple example. The figures are two objects to be matched some of whose regions meet the constraints of the shape similarity model. Their respective region orderings with respect to the reference direction shown in the figure, are given by (ABCD) and (EFGHIJK). The set sequence of candidate matches is given by ({A},{B},{A},{B},{C},{ },{D}), where $S_1=\{A\}$, $S_2=\{B\}$, and so on. There are two LCS that have length with respective region correspondences as {(A,E)(B,H)(C,I)(D,K)} and {(A,G)(B,H)(C,I)(D,K)}. The correctness of these correspondences can be judged in the recognition stage to be described next.

3. Pose computation

Using the correspondence between logical regions, the individual region transforms can be recovered in a variety of ways including feature matching or direct region matching as mentioned in a paper entitled "Recognition using Region Correspondence" in Proceedings Intl. Conference on Computer Vision (ICCV), Boston, 1995 by R. Basri and D. Jacobs. For the domain of documents, since the logical regions are rectangular, the pose parameters of interest are the four elements of the linear transform matrix A and the residual translation T. For a pair of corresponding regions $R_{Mi}$ and $R_{Ij}$, these are denoted by $$A_{ij} = \begin{pmatrix} s_{1ij} & 0 \\ 0 & s_{2ij} \end{pmatrix}, T_{ij} = \begin{pmatrix} T_{1ij} \\ T_{2ij} \end{pmatrix}$$

where $s_{1ij}=\Delta x_j/\Delta x_i$ $s_{2ij}=\Delta y_j/\Delta y_i$ $T_{ij}=C_{Mj}-C_{Ij}$ where ($\Delta x,\Delta y$) are the width and height of the rectangular region.

4. Pose Verification

Pose verification involves determining if the two documents register under the shape similarity model. For this the computed residual translation given in the above equation is corrected such that the resulting residual translation is forced to be exactly along the reference direction and within the stated bounds on the extent of such displacement. This is done by perpendicularly projecting the point representing the computed residual translation onto the line of direction θ and taking the point of such projection as the new residual translation $T_{ij_{new}}$ for each pair of corresponding regions.

Each rectangular region $R_i$ on object M can now be projected onto the object I to give the projected rectangular region $R_i'$ as follows. The centroid of the region $C_{Mi}$ is moved to the position $$C_{Ii} = C_{Mi} + T_{ij_{new}}$$

Verification is then done by seeing the extent of overlap between $R_i'$ region and the corresponding rectangular region $R_{ij}$ of the correspondence pair. The verification score is given by V(M,I)

$$V(M, I) = \frac{\sum_{i,j} R_i' \cap R_{ij}}{\sum_k R_{Mk} \cup \sum_l R_{Il}}$$

where ∩ and ∪ are done over the region areas. The above formula accounts for the extent of match as measured by the extent of spatial overlap of corresponding regions, and the extent of mismatch as measured by the areas of regions that do not find the match (included in the denominator term).

C. Examples

Figure 4:
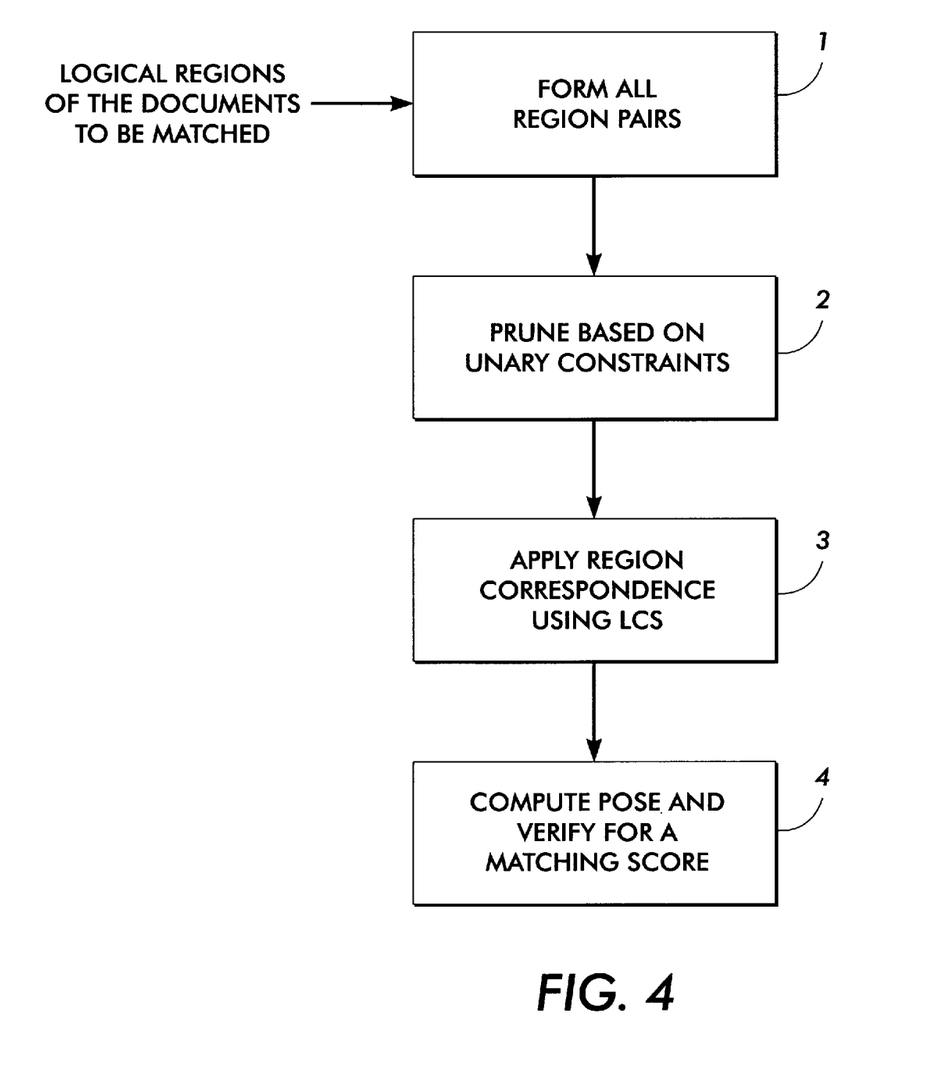
FIG. 4 illustrates a flow diagram of the document matching method.
Figure 5:
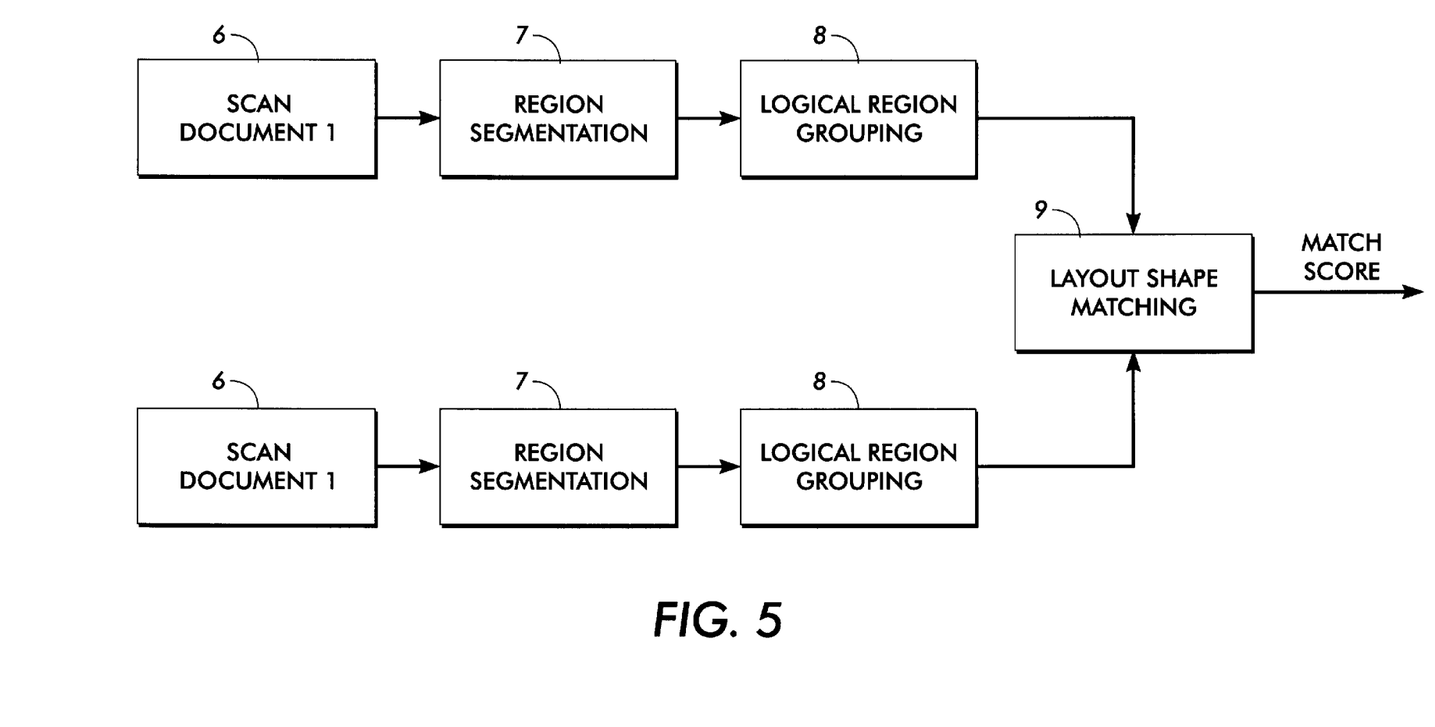
FIG. 5 illustrates an example application of the shape matching method to two diagrams.

Referring to FIG. 4, a flow chart representing the four major steps of document recognition employing the invention, after logical regions of documents to be matched are identified. Logical region extraction occurs within the first two blocks where First 1 all region pairs are formed, and then the documents are pruned 2 based on unary constraints discussed in further detail below. Region correspondence is then determined between documents 3. A pose is computed 4 for the documents and match verification is determined based a matching score. FIG. 5 is another diagram depicting a more specific scenario where two documents (1 and 2) are scanned, and enter a region segmentation module 7 to establish a correspondence between the regions on the documents. A logical region grouping module 8 is then allowed to form region pairs, and unary constraints are then applied to the documents in a layout shape matching module 9 resulting is a matching score between the documents.

Figure 2A:
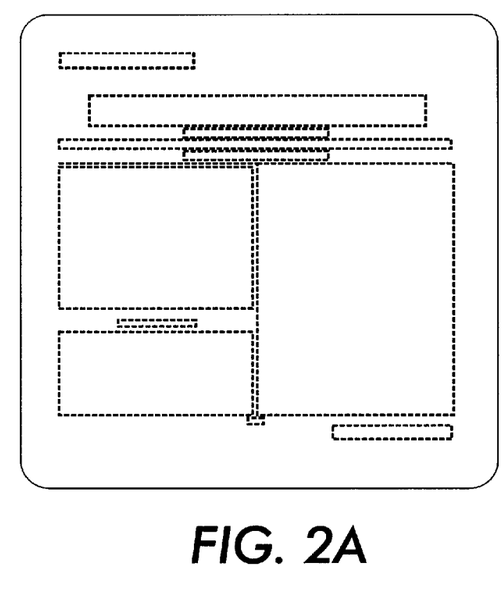
FIG. 2A and 2B illustrate the similarities and differences in the layout of the logical regions of FIG. 1A and 1B respectively.
Figure 2B:
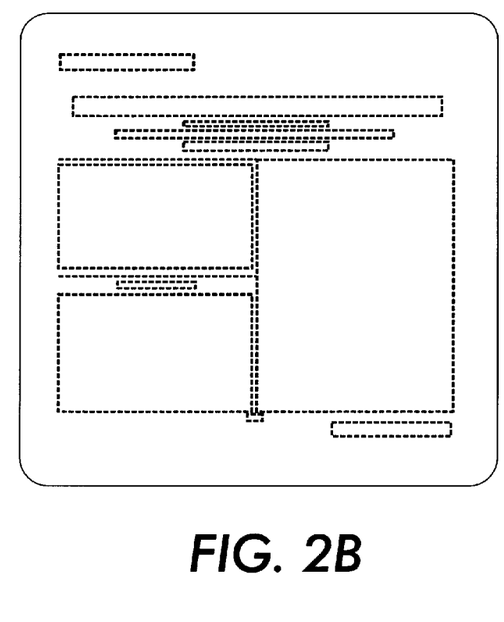

Referring back to FIGS. 1A and 2A, illustrated is the logical region grouping for documents. FIG. 1A shows text regions given by a conventional text segmentation algorithm. FIG. 2A shows the result of logical grouping on the document image of FIG. 1A.

Figure 6A:
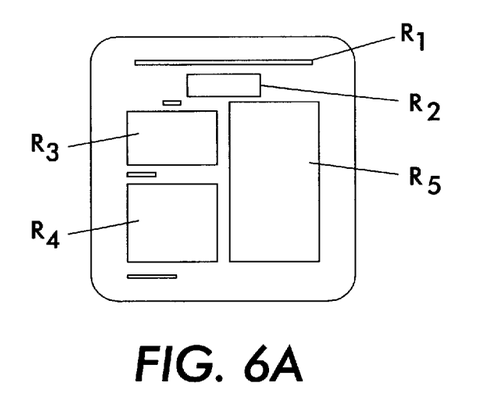
FIGS. 6A illustrates a prototype document used for the comparison of other documents.
Figure 6B:
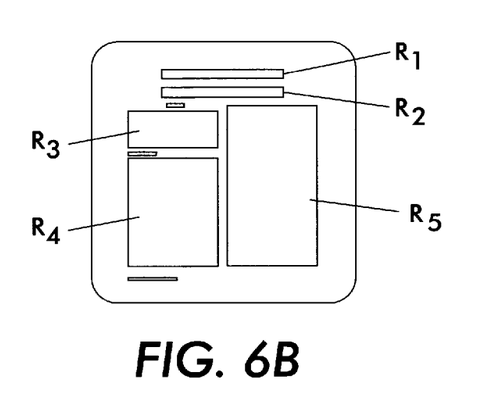
FIG. 6B illustrates a document of the same category of the prototype document of 6A.
Figure 6C:
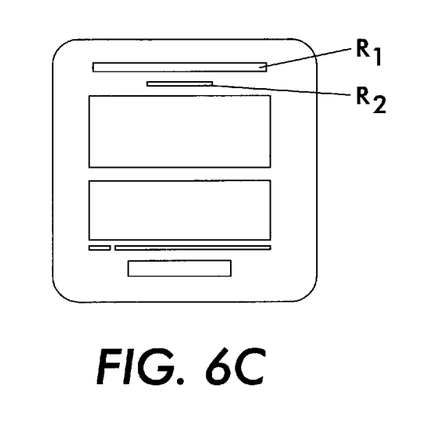
FIG. 6C illustrates a document of a different category than the prototype document of 6A.
Figure 7A:
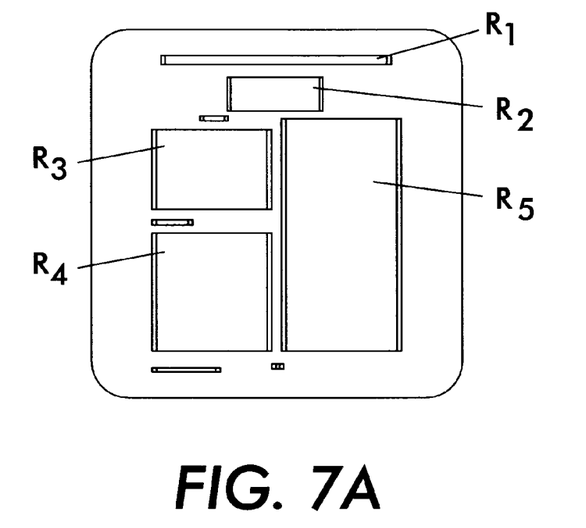
FIG. 7A illustrates the projection of the document regions of the document of FIG. 6B onto regions of the prototype.
Figure 7B:
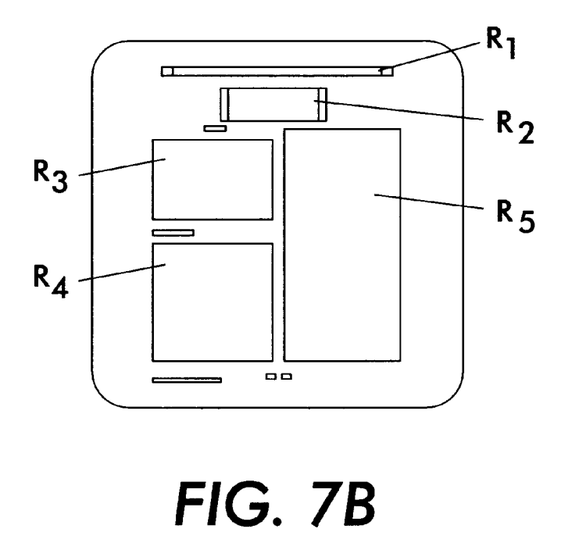
FIG. 7B illustrates the projection of document regions of the document of FIG. 6C onto regions of the prototype.

Next, we illustrate region correspondence. FIG. 6A depicts a model document by its logical regions. FIGS. 6B and C are two other documents only one of which is similar (FIG. 6B) in spatial layout to the document in FIG. 6A. This can be observed from the higher number of corresponding regions (labeled R1 through R5 in FIG. 7) obtained when the document of FIG. 6B is matched to FIG. 6A. Here we assume a vertical reference direction, and the matching regions are indicating by identical colors. As can be seen, the poor correspondence of object in FIG. 6C indicates a mismatch. This can also be seen during the verification stage where the pose parameters computed (and corrected) from region correspondences defamed by overlap as the document of FIG. 6A is overlayed onto the documents of FIGS. 6B and C. The extent of overlap in such overlay is indicated in FIGS. 7A and B, respectively, as R1 through R5.

D. Document Matching System

Figure 8:
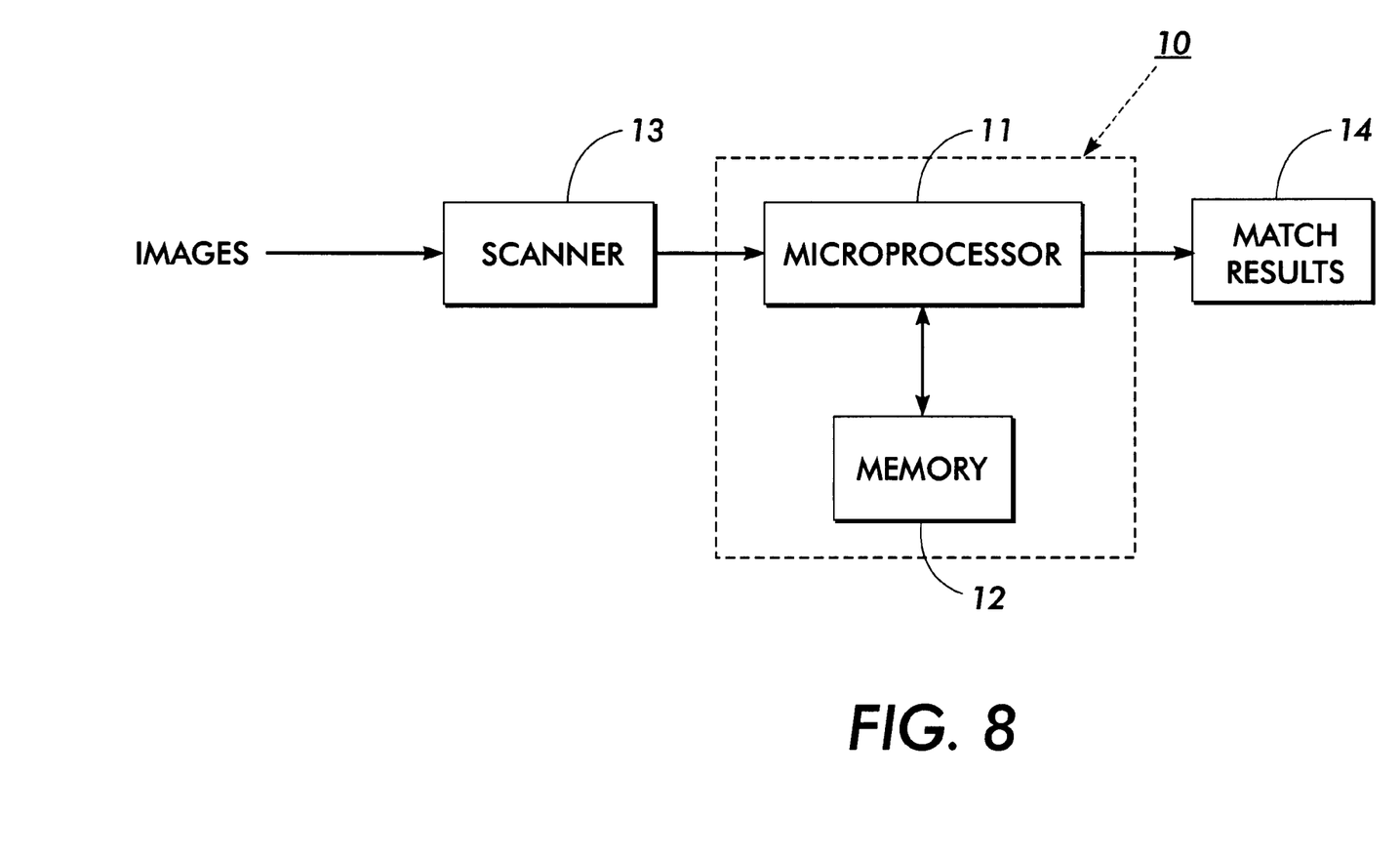
FIG. 8 illustrates a block diagram of main components for the invention.

The method of the invention can be carried out in a microprocessor-based system 10 as shown generally in FIG. 8. The microprocessor 11 would be programmed to carry out the four main steps of the invention. A memory 12 would be utilized by the microprocessor 11 for storing document templates and tested documents during matching operations. A scanner 13 may be used to scan the test documents into the document matching system; however, as known in the art, documents may be delivered to the system via electronic networks, or the like. Results of testing can be output 14 to the user with indicating means known in the art.

The method of document matching by spatial region layout can be a useful complement to existing methods for document matching based on text keywords or pixelwise image content. As can be seen from the examples above, the capturing of spatial layout similarity allows the matching of documents that have greater variations in pixelwise image content. In addition, the matching method is a general formulation that can be applied to other classes of 2D objects besides documents.

The foregoing description of the invention has been presented for purposes of illustration and to describe the best mode known for implementing of the invention. It is not intended to be exhaustive or to limit the invention to the precise forms disclosed. Obvious modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated, as long as the principles described herein are followed. Thus, changes can be made in the above-described invention without departing from the intent and scope thereof. Therefore, it is intended that the specification and any examples be considered as exemplary only, with the true scope and spirit of the invention being indicated in the following claims.

I claim:

1. A method for matching perceptual shape similarity layouts across a plurality of 2D objects each characterized by a set of regions representing one or more logical entities, comprising the steps of:
   a. determining at least one shape similarity model describing shape class characteristics of each of said 2D objects M consisting of a set of m regions denoted $R_{mi}$ i=1 to m, said 2D object M being similar to another of said 2D objects (I) characterized by the set of regions $R_{Ij,j=1, \ldots n}$;
   b. determining at least one correspondence region between pairs of said 2D objects using constraints of said shape similarity model such that shape deformations of corresponding regions can be specified by a set of affine transforms, denoted as $A_{ij}$ denoting a linear transform matrix, $T_{ij}$ denoting a residual translation;
   c. displacing object regions along a common reference direction θ such that the direction of residual translation remains the same;
   d. pruning all pairs whose direction of residual translation is not in the specified direction θ within a predetermined threshold to allow robustness against segmentation errors and deviations from the shape similarity model in individual objects;

e. recovering individual region transforms using said correspondence between logical regions; and f. determining if said object pairs match under said shape similarity model;

g. bounding the amount of displacement each of said object regions can undergo so as to maintain perceptual similarity; and h. restricting said displacement of regions such that a relative ordering of corresponding regions on said 2D objects with respect to θ remains constant.

2. A method as defined in claim 1, wherein the direction of residual translation of corresponding regions is denoted by: $\gamma_{ijy} = \gamma_{ijx} \tan \theta, \forall i,j$ where $(\gamma_{ijx}, \gamma_{ijy})^T = \gamma_{ij} = C_{Ij} - C_{Mi}$ is the residual translation and $C_{Ij}$ and $C_{Mi}$ are the centroids of the regions $R_{Ij}$ in object (I) and $R_{Mi}$ of object M, (when θ=90 degrees, $\gamma_{ijx}$=0.).

3. A method as defined in claim 2, wherein ordering of regions is obtained by projecting centroids of said regions onto said reference direction θ using a direction of projection such that a particular region ordering for each of said 2D objects is denoted by $R=(R_{j1}, R_{j2}, \ldots R_{jm})$ and that regions of the same rank appear in this sequence ordered along said direction of projection.

4. A method as defined in claim 2, wherein the direction of residual translation can be either manually specified or automatically derived by computing the direction of residual motion for all pairs of regions, and recording the commonality in direction using a Hough transform.

5. A method as defined in claim 1, wherein said collection of regions representing one or more logical entities of said multiple 2D objects are text regions.

6. A method as defined in claim 5, wherein said logical regions are obtained by a grouping algorithm using text segment regions derived from a text segmentation algorithm.

7. A method as defined in claim 6, wherein said text segment regions are defined by a plurality of bounding boxes which are left aligned, right aligned, or centrally aligned and which are vertically spaced by a small distance such that said distance thresholds are chosen relative to the image size.

8. A method as defined in claim 1, wherein said thresholds are derived by the recordation of at least one inter-region separation over a training set of objects and wherein a pixel-wise separation in said training set of objects is recorded.

9. A method as defined in claim 7, wherein said regions are grouped by the steps of:

a. clustering all text segments into their own groups;

b. for each text segment, determining text segments which fall within a logical region distance constraint;

c. merging all such regions into one group; and d. repeating the merging step of (c) until the set of merged groups cannot be further reduced.

10. A method as defined in claim 1, wherein the extent of residual translation is used to further prune the pairs.

11. A method as defined in claim 1, wherein distinct regions in said pairs on each object are ordered with respect to the reference direction such that said region orderings can be denoted by the sequences $R_M$ and $R_I$ respectively.

12. A method as defined in claim 11, wherein, using said region ordering, a set of candidate matching regions are collected in object M for each region of object (I) by $S_i$ such that the result can be denoted by the set sequence $S_p = (S_1, S_2, \ldots S_p)$ where p is the number of regions in object (I) that found a match to a region in object M.

13. A method as defined in claim 11, wherein a best region correspondence is selected as the longest sub-sequence of $R_M$ that is also a member sequence of $S_p$ such that each member sequence of $S_p$ is a sequence of regions with at most one region taken from the set $S_i$.

14. A method as defined in claim 13, wherein the largest set of corresponding regions between query and prototype move along the same direction within bounds of the shape model, have a match in individual content, and retain a specified spatial layout ordering.

15. A method as defined in claim 14, wherein said step of recovering individual region transforms, in the set of 2D objects representing rectangular objects, the pose parameters comprise four elements of a linear transform matrix A and a residual translation T, such that, for a pair of corresponding regions $R_{Mi}$ and $R_{Ij}$, $$A_{ij} = \begin{pmatrix} s_{1ij} & 0 \\ 0 & s_{2ij} \end{pmatrix},$$

$$T_{ij} = \begin{pmatrix} T_{1ij} \\ T_{2ij} \end{pmatrix}$$

where:

$$s_{1ij} = \Delta x_j / \Delta x_i$$

$$s_{2ij} = \Delta y_j / \Delta y_i,$$

$$T_{ij} = C_{Mj} - C_{Ij}$$

and (Δx,Δy) are the width and height of a region of said rectangular objects.

16. A method as defined in claim 1, wherein, using said correspondence between logical regions, individual region transforms can be recovered by either of feature matching or direct region matching.

17. A method as defined in claim 15, further comprising the step of perpendicularly projecting a point representing the computed residual translation onto the line of direction θ and taking the point of such projection as the new residual translation $T_{ijnew}$ for each pair of said corresponding regions.

18. A method as defined in claim 17, wherein each rectangular region $R_i$, on 2D object M is projected onto 2D object (I) to give a projected rectangular region $R_i'$, wherein a verification step is performed by determining the extent of overlap between $R_i'$, region and the corresponding rectangular region $R_{Ij}$ of the correspondence pair, such verification is given by:

$$V(M, I) = \frac{\sum_{i,j} R_i' \cap R_{Ij}}{\sum_k R_{Mk} \cup \sum_l R_{Il}}$$

where ∩ and ∪ are done over the region areas.

19. A method as defined in claim 18, wherein a centroid of region $C_{Mi}$ is moved to the position $C_{Ii} = C_{Mi} + T_{ijnew}$ in order to account for the extent of match as measured by the extent of spatial overlap of said corresponding regions, and the extent of mismatch as measured by the areas of regions that do not find the match included in the denominator term.

* * * * *